United States Patent
Weingertner et al.

(10) Patent No.: US 10,212,552 B2
(45) Date of Patent: Feb. 19, 2019

(54) METHODS AND DEVICES FOR CONTROLLING SPEECH QUALITY

(71) Applicant: Intel Corporation, Santa Clara, CA (US)

(72) Inventors: Philippe Weingertner, Fayence (FR); Eric Serre, Le Tignet (FR); Christophe Beaugeant, Mouans Sartoux (FR); Jerome Parron, Fuerth (DE)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 15/007,338

(22) Filed: Jan. 27, 2016

(65) Prior Publication Data
US 2016/0286575 A1 Sep. 29, 2016

(30) Foreign Application Priority Data
Mar. 24, 2015 (DE) .................... 10 2015 104 407

(51) Int. Cl.
| | |
|---|---|
| *H04L 12/50* | (2006.01) |
| *H04W 4/02* | (2018.01) |
| *H04W 28/14* | (2009.01) |
| *H04M 1/253* | (2006.01) |
| *G10L 19/16* | (2013.01) |
| *H04W 88/18* | (2009.01) |
| *H04L 12/26* | (2006.01) |
| *H04L 12/841* | (2013.01) |
| *H04L 12/875* | (2013.01) |

(52) U.S. Cl.
CPC .......... *H04W 4/027* (2013.01); *G10L 19/167* (2013.01); *H04M 1/2535* (2013.01); *H04W 28/14* (2013.01); *H04L 43/0852* (2013.01); *H04L 47/28* (2013.01); *H04L 47/56* (2013.01); *H04W 88/181* (2013.01)

(58) Field of Classification Search
CPC ....................................... H04L 12/50
USPC ....................................... 370/401
See application file for complete search history.

(56) References Cited

U.S. PATENT DOCUMENTS

2007/0236599 A1* 10/2007 van Beek ............... H04N 7/163
348/419.1
2012/0265522 A1* 10/2012 Fex .......................... G10L 21/04
704/201

FOREIGN PATENT DOCUMENTS

WO   WO-2013/051975 A1   4/2013

* cited by examiner

*Primary Examiner* — Dang T Ton
(74) *Attorney, Agent, or Firm* — Schiff Hardin LLP

(57) ABSTRACT

The disclosure relates to methods and devices for controlling speech quality, in particular by controlling end-to-end latency and by improving speech quality in case of mobility scenarios. A method 200 for controlling end-to-end latency between receiving and processing audio frames includes: receiving 201 a data packet comprising at least one coded audio frame; storing 202 the received data packet in a packet buffer; retrieving 203 the received data packet from the packet buffer and decoding the at least one coded audio frame into audio samples; and processing 204 the audio samples, wherein a scheduling of retrieving 203 the received data packet from the packet buffer and decoding the at least one coded audio frame is based on a target criterion with respect to audio quality of the audio samples and latency between receiving the data packet and processing the audio samples, and wherein the scheduling is dynamically and smoothly shifted in time in order to avoid audio distortions.

25 Claims, 12 Drawing Sheets

METHODS AND DEVICES FOR CONTROLLING SPEECH QUALITY

FIELD

The disclosure relates to a method and a device for controlling end-to-end latency between receiving and processing audio frames. The disclosure further relates to a media processing circuit for use in a mobile terminal and to a method for adjusting a jitter buffer size in a media processing circuit of a mobile terminal. In particular, the disclosure relates to a method for minimizing Voice-over-LTE and Voice-over-IP end-to-end media delay using a sample based jitter buffer management and shared PCM buffer in downlink combined with fine grained synchronization and adaptive scheduling between speech enhancements, codecs and sample based jitter buffer management. In particular, the disclosure further relates to improved Voice-over-LTE, Voice-over-IP and video jitter buffer management in high mobility scenarios.

BACKGROUND

Implementations of media calls over packet switched networks have to cope with network jitter, i.e. transfer times will vary and packets may arrive out of order. In order to cope with such issues, media engines on the receiver side are usually using a JBM (Jitter Buffer Management) system. In order to predict the optimal amount of buffering enabling to protect over jitter but without increasing end-to-end latency more than necessary, different strategies have been derived. Actually, all these implementations try to predict network behavior for the future short term based on recent but past information.

Methods and devices employed in media processing, in particular in wireless communication networks, in particular in Voice-over-IP (VoIP) systems, in particular in Voice-over-LTE (VoLTE) systems constantly have to be improved. It may be desirable to improve the end-to-end latency in media processing, in particular in the mobile receiver.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
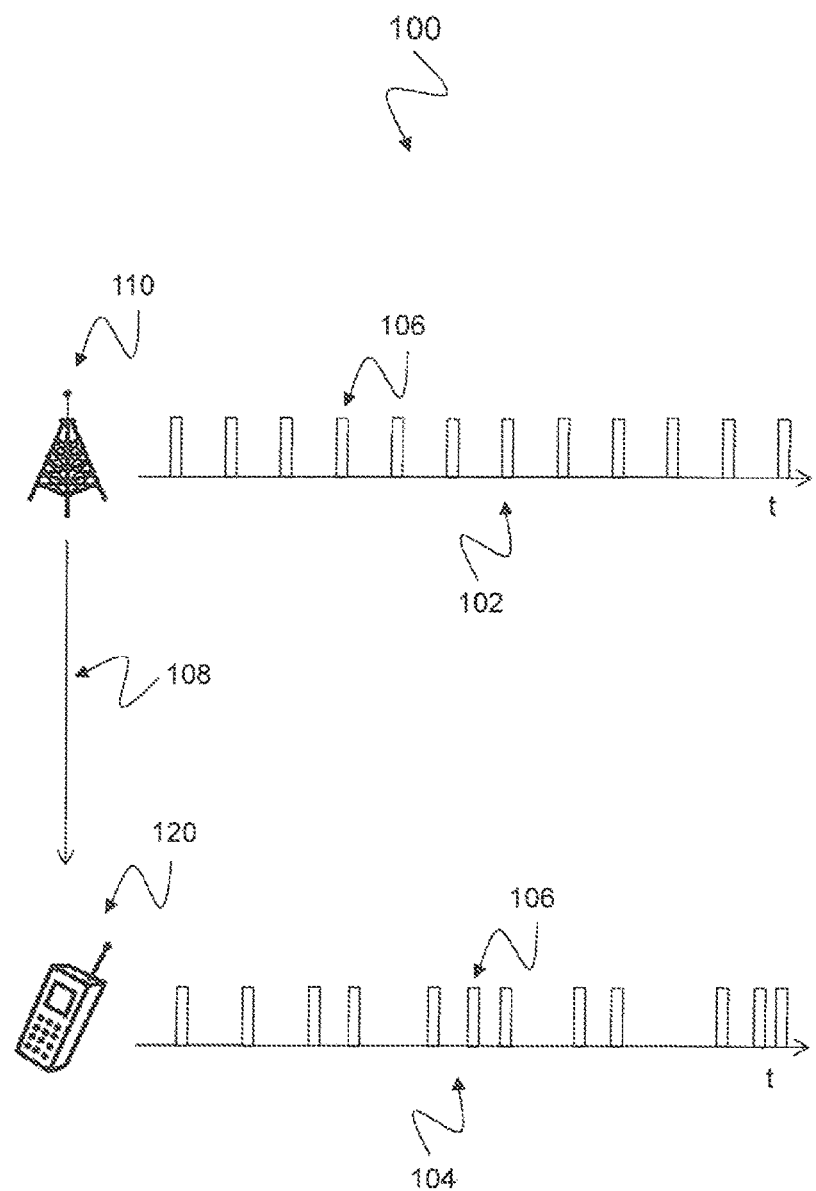
FIG. 1 is a schematic diagram of a radio communication network 100 including a base station 110 and a mobile terminal 120.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The methods and devices described herein may be based on end-to-end latency and control of end-to-end latency. End-to-end delay or end-to-end latency refers to the time taken for a packet to be transmitted across a network (or system or device) from source to destination. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in packet switched networks, in particular IP (Internet Protocol) based networks. The methods and devices described herein may be implemented in wired and wireless communication networks, in particular in communication networks based on Voice over Internet-Protocol (VoIP), in particular communication networks based on Voice over Long Term Evolution (VoLTE). The methods and devices described herein may be implemented in wireless communication networks such as LTE, UMTS (Universal Mobile Telecommunications System) and 3GPP ($3^{rd}$ Generation Partnership Project) systems. The methods and devices described below may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein may be used to control jitter buffer management. Jitter is a significant but usually undesired factor in the design of almost all communications links. In packet switched networks, jitter is the variation in latency as measured in the variability over time of the packet latency across a network. Jitter buffers are used to counter jitter introduced by queuing in packet switched networks so that a continuous playout of media, e.g. audio or video transmitted over the network can be ensured. The maximum jitter that can be countered by a jitter buffer is equal to the buffering delay introduced before starting the play-out of the media stream. Jitter buffer management is used to control and manage a jitter buffer.

The methods and devices described herein may include AMR (Adaptive Multi Rate) codecs, EVS (Enhanced Voice Services according to 3GPP TS 26.444) codecs, WSOLA (Waveform Similarity based Overlap and Add) and PSOLA (Pitch Synchronous Overlap and Add) codecs. The AMR audio codec is an audio compression format optimized for speech coding. The AMR speech codec consists of a multi-rate narrowband speech codec that encodes narrowband signals (about 200-3400 Hz) at variable bit rates ranging from about 4.75 to about 12.2 kbit/s with toll quality speech starting at 7.4 kbit/s. AMR is adopted as the standard speech codec by 3GPP and is now widely used in GSM, UMTS and LTE. It uses link adaptation to select from one of eight different bit rates based on link conditions. AMR also denotes a file format for storing spoken audio using the AMR codec. PSOLA is a digital signal processing technique used for speech processing and more specifically speech synthesis. PSOLA can be used to modify the pitch and duration of a speech signal. PSOLA works by dividing the speech waveform in small overlapping segments. To change the pitch of the signal, the segments are moved further apart (for decreasing the pitch) or closer together (for increasing the pitch). To change the duration of the signal, the segments are then repeated multiple times (for increasing the duration) or some segments are eliminated (for decreasing the duration). The segments are then combined by using the overlap add technique.

The methods and devices described herein may use POLQA speech signal analysis. POLQA covers a model to predict speech quality by means of digital speech signal analysis. The predictions of those objective measures should come as close as possible to subjective quality scores as obtained in subjective listening tests. Usually, a Mean Opinion Score (MOS) is predicted. POLQA uses real speech as a test stimulus for assessing telephony networks.

The methods and devices described herein may be based on RTP (Real-time Transport Protocol) packets. RTP defines a standardized packet format for delivering audio and video over IP networks. RTP is designed for end-to-end, real-time, transfer of stream data. The protocol provides facilities for jitter compensation and detection of out of sequence arrival in data, which are common during transmissions on an IP network.

The methods and devices described herein may include PCM (Pulse-Code Modulation) samples and PCM buffers. PCM is a technique used to digitally represent sampled analog signals. PCM is the standard format for digital audio applications, e.g. used in computers, compact discs and digital telephony. In a PCM stream, the amplitude of the analog signal is sampled regularly at uniform intervals, and each sample is quantized to the nearest value within a range of digital steps.

FIG. 1 is a schematic diagram of a radio communication network 100 including a base station 110 and a mobile terminal 120. In radio communications between a base station 110 and a mobile terminal or User Equipment (UE) 120, a transmit signal 102 may be transmitted by the base station 110 and received by the UE 120 as receive signal 104. Due to jitter effects on the transmission path 108 between base station 110 and UE 120, the receive signal 104 may be subject to delay variation, i.e. the packets 106 of the transmit signal 102 may experience a variation in latency over time and some or all packets 106 may be received out-of-order. The transmission path 108 between base station 110 and UE 120 may include a lot of network components that are not depicted in FIG. 1. Further jitter effects may occur in the UE 120 between reception of the receive signal 104 and playout of the receive signal 104.

Figure 2:
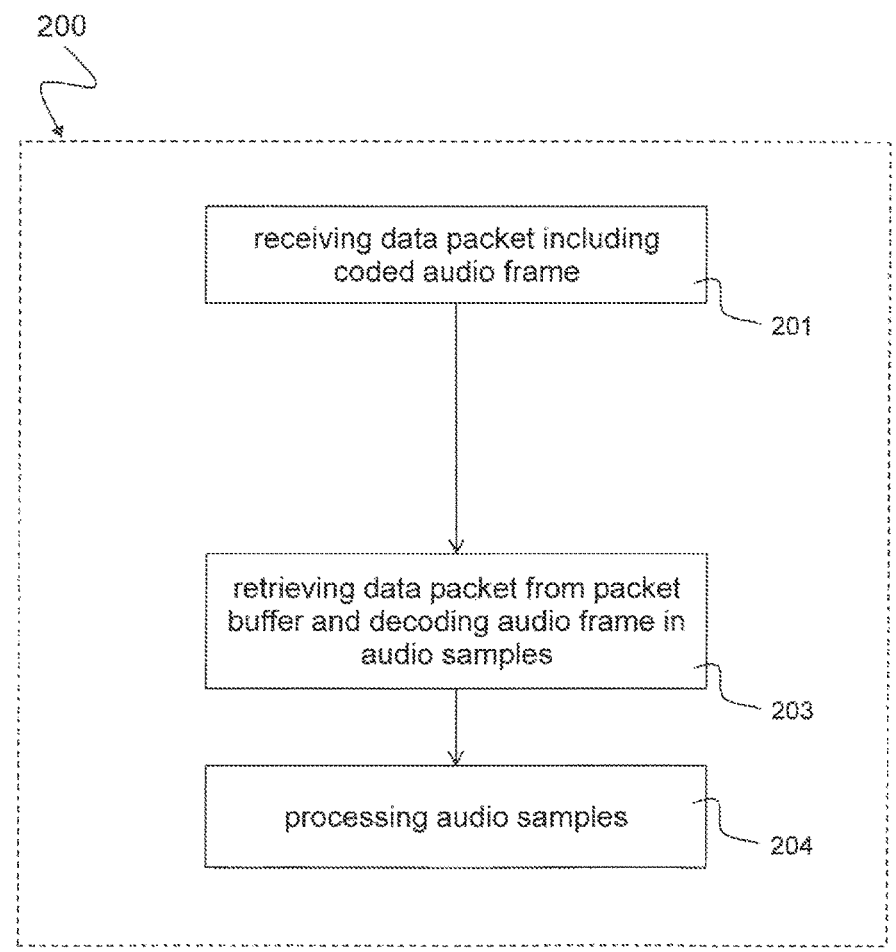
FIG. 2 is a schematic diagram of a method 200 for controlling end-to-end latency between receiving and processing audio frames in accordance with the disclosure.

FIG. 2 is a schematic diagram of a method 200 for controlling end-to-end latency between receiving and processing audio frames in accordance with the disclosure. The method 200 includes receiving 201 a data packet comprising at least one coded audio frame. The method 200 includes storing 202 the received data packet in a packet buffer. The method 200 includes retrieving 203 the received data packet from the packet buffer and decoding the at least one coded audio frame into audio samples. The method 200 includes processing 204 the audio samples, wherein a scheduling of retrieving 203 the received data packet from the packet buffer and decoding the at least one coded audio frame is based on a target criterion with respect to audio quality of the audio samples and latency between receiving the data packet and processing the audio samples, and wherein the scheduling is dynamically and smoothly shifted in time in order to avoid audio distortions. Hence, the method 200 controls end to end latency by enabling a dynamic, smooth and adaptive scheduling of the various audio activities. Audio playback and codec decoding triggers may be adjusted dynamically on top of buffering increase or decrease: and this will enable lower end to end latency even in case there is no jitter.

The scheduling of retrieving 203 the received data packet from the packet buffer and decoding the at least one coded audio frame may be based on time-scaling the at least one decoded audio frame in order to move a processing of the received data packet in an optimal position with respect to a minimal latency. The time-scaling the at least one decoded audio frame may include frame compression 309, e.g. as described below with respect to FIG. 3 for reducing the latency between receiving the data packet and processing the audio samples. The time-scaling the at least one coded audio frame may include frame expansion 317, e.g. as described below with respect to FIG. 3 for increasing the latency between receiving the data packet and processing the audio samples. The time-scaling the at least one coded audio frame may include idle activity 313 with respect to frame compression and frame expansion, e.g. as described below with respect to FIG. 3 for keeping the latency between receiving the data packet and processing the audio samples.

The time-scaling may be used for shifting the scheduling in order to modify a position of the at least one decoded audio frame. The time-scaling may be based on one of speech frame compression and speech frame expansion. The method 200 may further include determining an optimal scheduling based on statistics information about latency between received data and played-out data, for example RTP statistics. The method 200 may further include determining an optimal scheduling based on modem statistics based on reception rate and/or retransmission rate. The time-scaling may be based on one of removing and adding a pitch period of the speech, e.g. as described below with respect to FIG. 5. The time-scaling may be based on pitch synchronous overlapping and adding, e.g. as described below with respect to FIG. 5. The data packet may be part of a stream of asynchronously received data packets. The method 200 may further include determining statistics of the latency between receiving a respective data packet of the stream of data packets and processing the audio samples of the respective data packet. The statistics may be used for the scheduling.

Retrieving the received data packet from the packet buffer and decoding the at least one coded audio frame and processing the audio samples may be based on a master clock, e.g. as described below with respect to FIG. 4. The scheduling of retrieving 203 the received data packet from the packet buffer and decoding the at least one coded audio frame may be performed by adjusting a clocking of retrieving the received data packet from the packet buffer and decoding the at least one coded audio frame. The scheduling may be performed by adjusting a clocking of processing the audio samples.

The method 200 may further include determining a latency between the received data packet and the processed audio samples. The method 200 may further include determining an audio quality of the audio samples. The method 200 may further include scheduling retrieving 203 the received data packet from the packet buffer and decoding the at least one coded audio frame such that the audio quality is above a first threshold and the latency between receiving the data packet and processing the audio samples is below a second threshold.

Determining the audio quality may be based on a model to predict speech quality by means of digital speech signal analysis, in particular based on Perceptual Objective Listening Quality Assessment (POLQA). Methods and devices described in this disclosure minimize the end-to-end delay in Voice over IP in general and Voice over LTE in particular. Methods and devices described in this disclosure may be related to VOIP downlink (DL) processing of audio system. Thanks to an adaptive sample based jitter buffer management enabling time scaling of speech frames (compressions and expansions), a shared downlink PCM buffer, and a fine grained synchronization between "downlink speech enhancements, sample based jitter buffer management and codec subsystems", a minimal latency between RTP packet reception and associated PCM playback can be guaranteed. The downlink latency is minimized without degrading speech quality in most of the network conditions with or without network jitter.

The idea as described in this disclosure relies on the combined use in an adaptive synchronized way of the following audio subsystems: a sample based jitter buffer management (SJBM) for enabling time scaling of speech frames (compressions and expansions), a downlink codec (for example a DL AMR or EVS decoder for VoLTE), a downlink speech enhancements subsystem, and a shared downlink PCM buffer that is shared between the DL codec/SJBM subsystem and the DL speech enhancements subsystem as described in the following.

Figure 3:
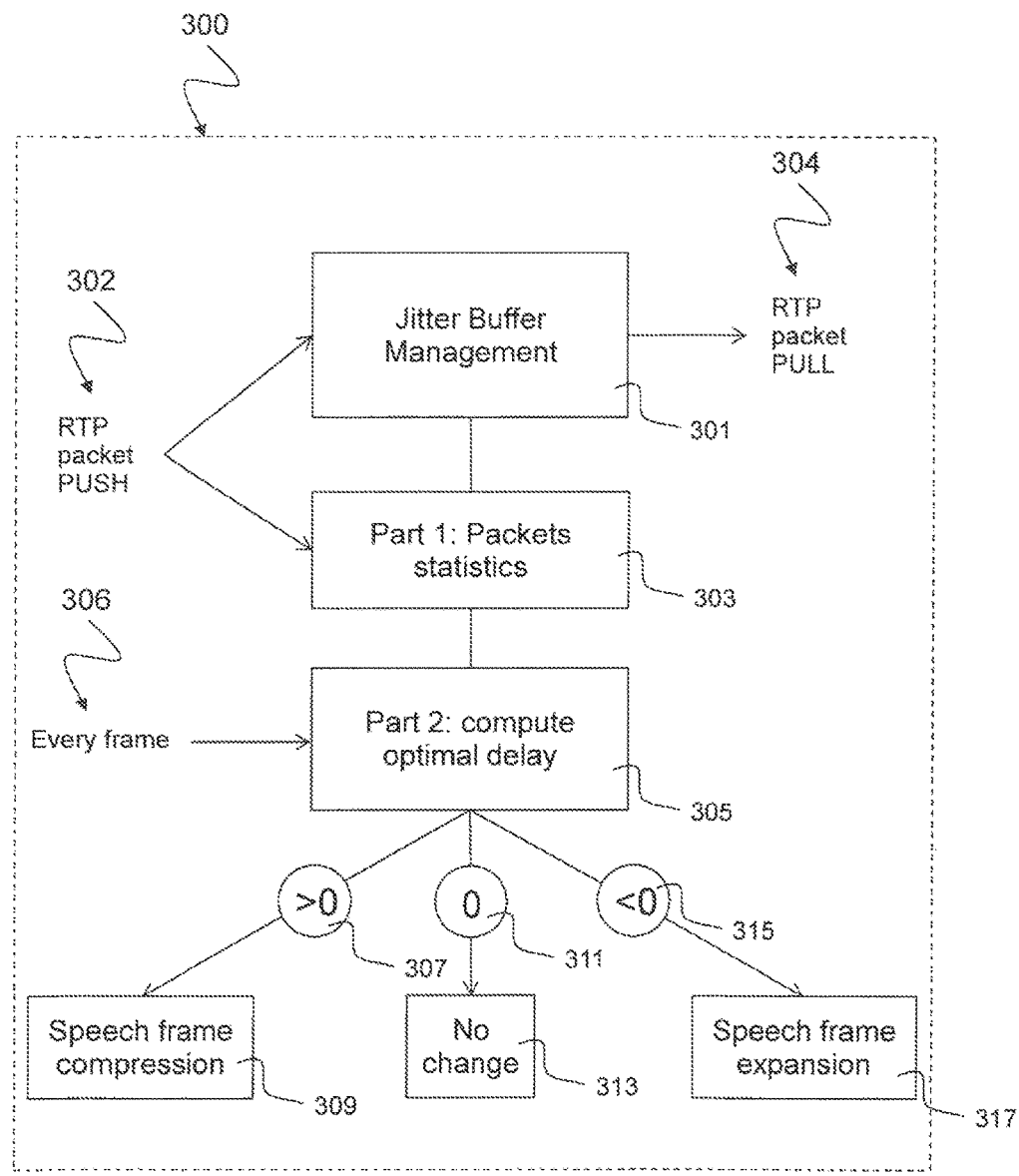
FIG. 3 is a schematic diagram of a control part 300 of an audio processing system in accordance with the disclosure.

FIG. 3 is a schematic diagram of a control part 300 of an audio processing system in accordance with the disclosure. The control part 300 includes a Jitter Buffer Management entity 301 for packets push/pull handling. The Jitter Buffer Management entity 301 is responsible for RTP packet push 302 and RTP packet pull 304 handling. The control part 300 includes a packet statistics entity 303 for collecting information about packets delays between RTP packets reception and their associated playout. In one example, the granularity of delay measurements may be better than 1 ms. The packet statistics entity 303 may be triggered by an RTP packet push 302 event.

The control part 300 further includes an optimal delay computation entity 305 configured to compute an optimal delay based on the packet statistics determined by the packet statistics entity 303 for every received frame 306. The optimal delay computation entity 305 is configured to derive optimal amount of buffering to cope with network jitter and optimal scheduling of SJBM and DL codec activities to lower down latency and issue a command for compression 309, expansion 317 or no change 313 of the speech frame. Depending on a target criterion, a command for compression 309 is issued if the target criterion is exceeded 307 (>0), a command for expansion 317 is issued if the computed delay is below target 315 (<0) and a command for no change 313 (or no command) is issued if the target criterion is fulfilled 311 (>0).

Delays between RTP packet reception 302 and playout 304 of the embedded speech payload may be precisely measured for every RTP packet by the packet statistics entity 303. Statistics may then be derived and dynamically updated packet statistics entity 303. Thanks to these statistics, before every speech frame processing that may typically happen every e.g. 20 ms (or e.g. 40 ms) in a VoLTE system, the optimal amount of buffering to cope with network jitter may be determined by the optimal delay computation entity 305, but also the optimal scheduling of the various audio activities for lowest latency. Knowing for how much TARGETED milliseconds some audio activities should be shifted, a speech frame time scaling command may be issued. The speech frame may be time scaled by adding or removing one pitch period, thereby ensuring minimal audible change to the speech frame and enabling adaptation even in cases where no silence period is available (or enabling faster adaptation with no need to wait for a silence period). After time scaling of the speech frame, the wakeup for next speech frame processing may be programmed and aligned to match the new length of the time scaled speech frame.

Figure 4:
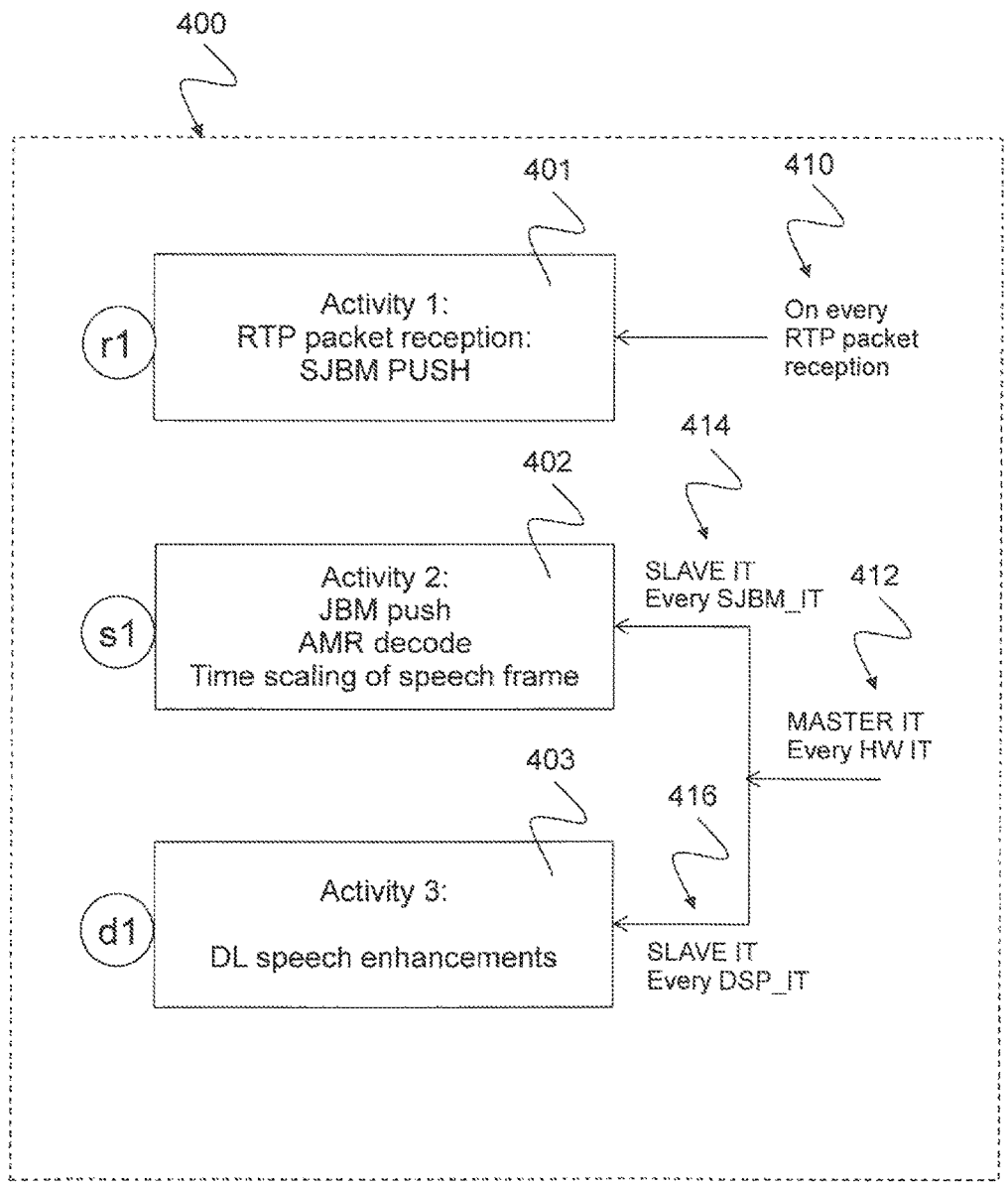
FIG. 4 is a schematic diagram of activities 400 to be scheduled in an audio processing system in accordance with the disclosure.

FIG. 4 is a schematic diagram of activities 400 to be scheduled in an audio processing system in accordance with the disclosure. FIG. 4 represents the different audio activities 401, 402, 403 that are scheduled during a VoLTE call (or a VoIP call).

Activity 1, 401 is triggered on every RTP packet reception 410. So it is an asynchronous activity (even if ideally without network jitter it should happen every 20 ms or 40 ms on a typical VoLTE system). When an RTP packet is received 410, the packet is pushed or stored into the SJBM (Sample based Jitter Buffer Management) buffer, unless it was received too late, after its expected playout time.

Activity 2, 402 relates to speech frame decoding that may typically happen every 20 ms (or 40 ms) on a VoLTE system. An RTP packet is retrieved from SJBM buffer. The AMR or EVS payload is decoded into PCM (Pulse-Code Modulated) samples and may be forwarded to the DL speech enhancements system. Here, instead of scheduling this activity 402 every 20 ms, the scheduling may be dynamically controlled and adapted. It can be less than 20 ms or more than 20 ms depending on how the processing of activity 2, 402 is shifted versus activity 3, 403.

Activity 3, 403 relates to DL speech enhancements. It may be performed on a specific DSP, but is not restricted to this architecture. Every, e.g., 1 ms the DL speech enhancements may retrieve PCM samples for processing. Different systems may use different granularity such as 5 ms, 10 ms or any other value. The smaller the granularity, the better may be the result for downlink latency minimization. Speech enhancements may be activities related to digital signal processing in order to enhance the speech signal, e.g. with respect to its waveform, delay, coding, etc.

The scheduling of activities 2, 403 and 3, 403 may be derived from the same master clock 412 or interrupt to avoid unwanted scheduling drifts.

In an example, the master clock 412 clocks every hardware interrupt (MASTER IT) milliseconds, e.g. every 1 millisecond. Activity 2, 402 may then be clocked every SJBM interrupt (SJBM IT) milliseconds, e.g. every N times MASTER IT milliseconds, where N is a configurable integer, for example every 20 ms or 16 ms after speech frame compression and updated after every speech frame processing. Activity 3, 403 may be clocked every DSP interrupt (DSP IT) milliseconds, e.g. every N times MASTER IT milliseconds, where N is a configurable integer, for example every 1 ms and fixed during the call.

Figure 5:
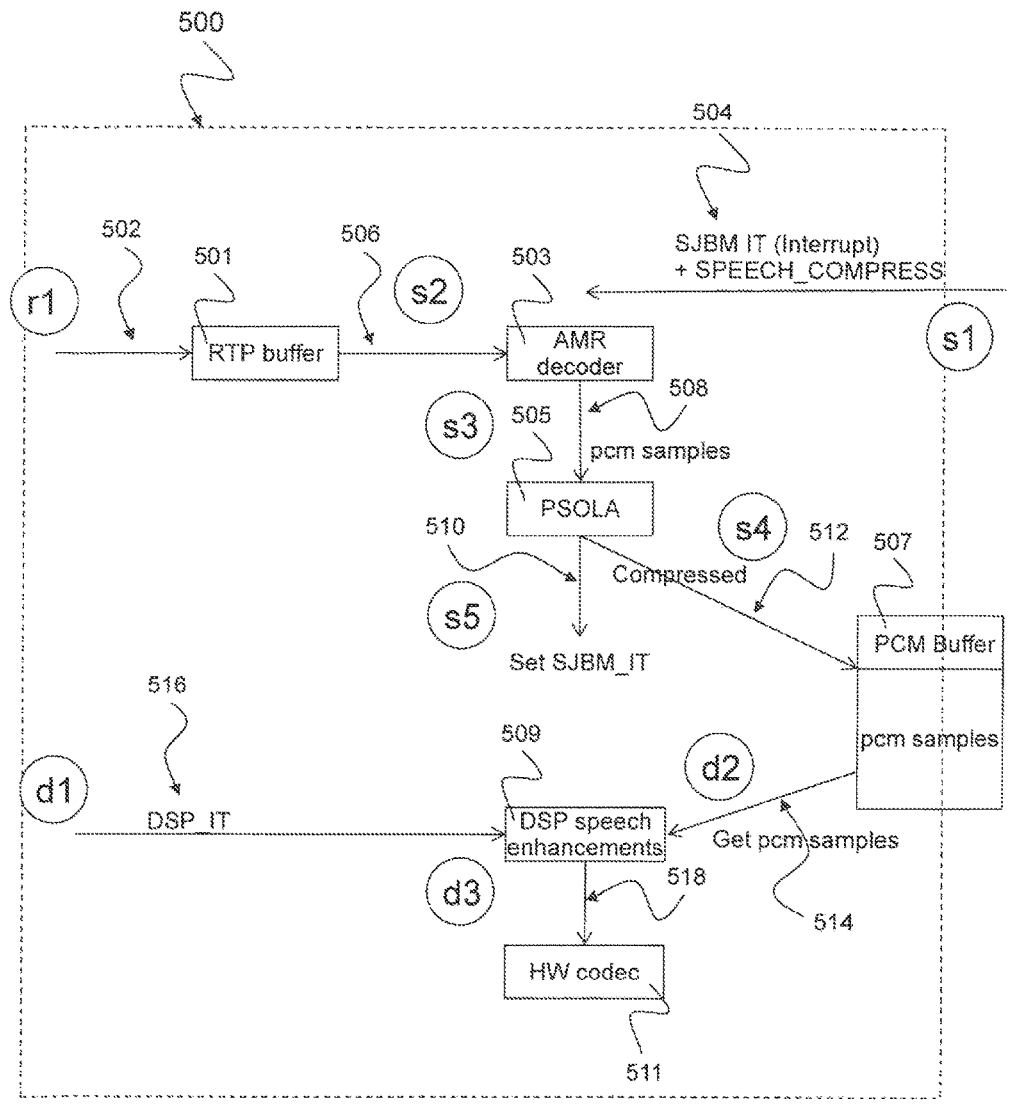
FIG. 5 is a schematic diagram of a scheduling system 500 for scheduling the activities described in FIG. 4 in accordance with the disclosure.

On FIG. 5, activity 1, 401 is identified with prefix "r", in particular "r1" (for RTP packet reception), activity 2, 402 is identified with prefix "s", in particular "s1" (for SJBM) and activity 3, 403 is identified with prefix "d", in particular "d1" (for DSP speech enhancements).

FIG. 5 is a schematic diagram of a scheduling system 500 for scheduling the activities described in FIG. 4 in accordance with the disclosure.

In FIG. 5, the detailed blocks to reduce latency are described. The specific numbers used here correspond to an illustrative example where a case of no network jitter is considered and it is shown how the SJBM (Sample based Jitter Buffer Management) can be used to reduce the downlink latency (even in case there is no network jitter). Any other numbers corresponding to different network conditions may be used as well.

As an illustration, the case where there is no network jitter is considered. RTP packets 502 arrive every 20 ms (r1 in FIG. 5), but the delay (excluding effective DL processing on the UE) between the reception of these RTP packets 502 and their corresponding playout (e.g. in the HW codec 511) is 6 ms. A command for speech frame compression 504 may be issued (s1 in FIG. 5). An RTP packet 506 is retrieved from RTP buffer 501 and decoded (by e.g. AMR decoder 503 or EVS decoder on a VoLTE system) and 20 ms of pcm samples 508 may be delivered by the DL decoder 503. Then, the frame may be compressed 512 thanks to a PSOLA algorithm 505, removing one pitch period in the speech frame. Assuming here a pitch period detected at 4 ms, the 20 ms speech frame may be compressed to 16 ms of PCM samples which are stored in the PCM buffer 507.

Now, instead of triggering the next AMR decoding 503 (or EVS decoding) 20 ms later, the next AMR decoding 503 (or EVS decoding) may be scheduled 16 ms later by setting the SJBM interrupt 510 to 16 ms. Then, the scheduling may come back to a scheduling every 20 ms for AMR decoding 503 (or EVS decoding). This way, a shift of activity 2 (s1, s2, s3, s4, s5 as described above with respect to FIG. 4) versus activity 3 (d1, d2, d3 as described above with respect to FIG. 4) is enforced, that enables to reduce the latency for 4 ms in this example. After this shift, RTP packets may be measured with a 2 ms delay (excluding effective DL processing on the UE) instead of 6 ms. The shift of downlink audio activities may be performed smoothly by just adding or removing one pitch period, thus ensuring minimal distortion during the frame on which the adaptation happens. This process is dynamic and may be repeated over and over depending on the statistics collected and the policy used to enforce the adjustment of DL audio activities scheduling.

Every DSP (Digital Signal Processing) interrupt 516, DSP speech enhancements entity 509 may get PCM samples 514 from PCM buffer 507, process these samples and pass them to the HW codec 511 for playout. Alternatively, the PCM samples 514 may be directly transferred to HW codec 511 without passing the DSP speech enhancements entity 509.

Here, a single step starting from a relatively low delay is shown. However, in order to cope with much bigger delays, several similar and successive steps like the one described here, may be performed to minimize the latency. Numbers provided here are illustrative and have been fixed for better understanding matching typical settings of a VoLTE system, but any other values may be used as well.

A SJBM is usually used to compress/expand frames to increase or decrease the amount of buffering to protect against network jitter, but here we also use the SJBM in case of no network jitter to reduce the downlink latency.

A shared downlink PCM buffer 507, a fine grained synchronization system and a different scheduling of codec and SJBM activities have been added on top of an already existing SJBM system to enable lower latency. The scheduling may be adapted dynamically during the call and may be changed at every frame.

Based on statistics collected during the VoIP call, before every speech frame processing the optimal amount of buffering to deal with network jitter, but also the optimal way of scheduling the different audio activities, is determined so that downlink latency can be minimized.

Then, an adaptive mechanism, shifting some audio activities versus other audio activities, may be performed thanks to the time scaling feature of the sample based jitter buffer management.

Without the use of an adaptive sample based jitter buffer management as described in this disclosure additional buffering may be required leading to additional latency.

Without the use of fine grained synchronization and scheduling between downlink speech enhancement subsystem, sample based jitter buffer management and codec subsystems, a lower speech quality and/or higher end to end latency may be experienced. Without the dynamic adaption of audio scheduling activities, speech frame processing may slower adapt.

The SJBM (Sample Based Jitter Buffer Management) as described in this disclosure may be used even in case of no jitter to reduce VoIP downlink latency.

Use cases in which methods and devices according to the disclosure may provide improved performances are, for example, VoIP scenarios with or without network jitter. Such methods and devices are also able to cope with scenarios with or without silence periods to seamlessly adapt and reduce the latency without degrading speech quality.

Methods and devices according to the disclosure are suitable for modem based solutions (with VoIP engine embedded into the modem so typically for low end solutions) and application processor based solutions (with VoIP engine embedded into the application processor, so typically for high end solutions). Methods and devices according to the disclosure are usable in both cases.

Methods and devices described in this disclosure implement solutions to reduce the overall end-to-end delay in VoLTE without degrading speech quality.

Figure 6:
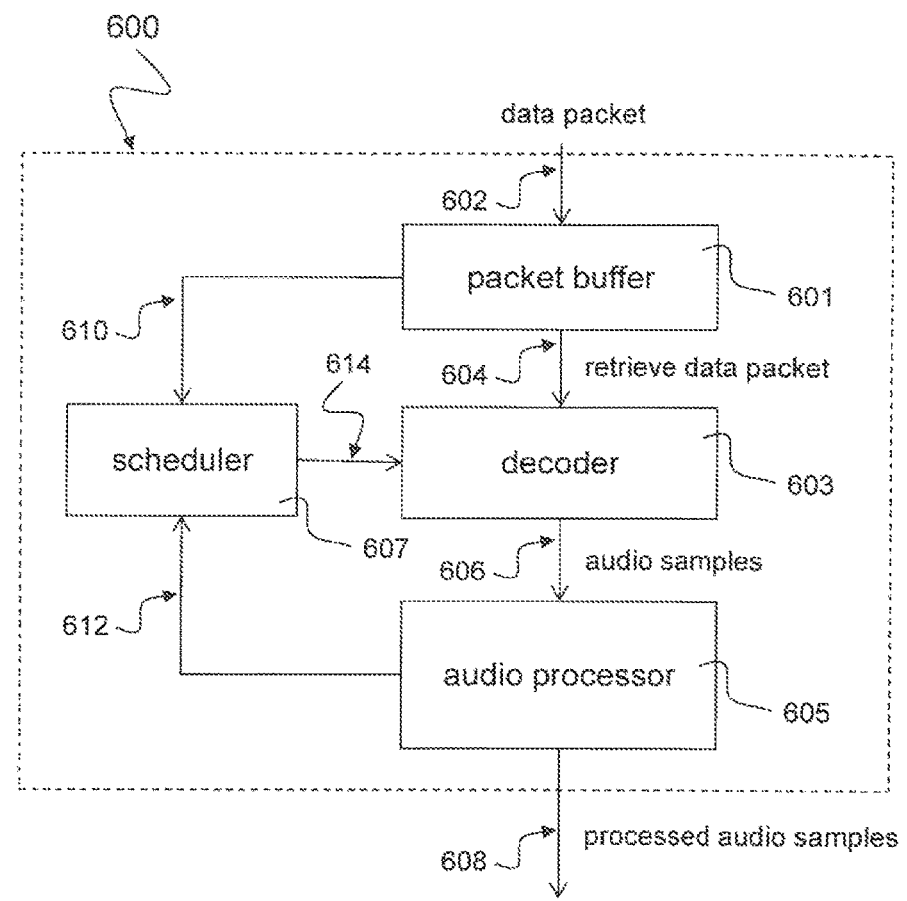
FIG. 6 is a schematic diagram of a device 600 for controlling end-to-end latency between receiving and processing audio frames in accordance with the disclosure.

FIG. 6 is a schematic diagram of a device 600 for controlling end-to-end latency between receiving and processing audio frames in accordance with the disclosure.

The device 600 includes a packet buffer 601, a decoder 603, an audio processor 605 and a scheduler 607. The packet buffer 601 is configured to receive a data packet 602 including at least one coded audio frame. The decoder 603 is configured to retrieve the received data packet 604 from the packet buffer 601 and to decode the at least one coded audio frame into audio samples 606. The audio processor 605 is configured to process the audio samples 606. The scheduler 607 is configured to schedule retrieving the received data packet 604 from the packet buffer 601 and decoding of the at least one coded audio frame based on a target criterion with respect to audio quality of the audio samples 606 and latency between receiving the data packet 602 by the packet buffer 601 and processing the audio samples 606 by the audio processor 605. The scheduler 607 is configured to dynamically and smoothly shift the scheduling in time in order to avoid audio distortions.

The device 600 may further include an audio buffer, e.g. an audio buffer 507 as described above with respect to FIG. 5 that is coupled between the decoder 603 and the audio processor 605. The decoder 603 may be configured to store the audio samples 606 in the audio buffer 507. The audio processor 605 may be configured to retrieve the audio samples 606 from the audio buffer 507.

The scheduler 607 may be configured to adjust at least one of an access rate of the decoder 603 for storing the audio samples in the audio buffer 507, an access rate of the audio processor 605 for retrieving the audio samples 606 from the audio buffer 507 and an access rate of pull requests to the audio buffer 507.

The scheduler 607 may be configured to adjust the access rate of the decoder 603 based on a first clock and the access rate of the audio processor 605 based on a second clock. The first clock and the second clock may be derived from a master clock or may be synchronized according to any other synchronization mechanism.

The scheduler 607 may be configured to schedule retrieving the received data packet 604 from the packet buffer 601 and decoding of the at least one coded audio frame based on adjusting a time-scaling of the decoder 603 for decoding the at least one coded audio frame. The decoder 603 may include a speech decoder, for example an AMR decoder 503 or an EVS (Enhanced Voice Services) decoder and/or a speech time scaler, for example a PSOLA compressor 505 or a WSOLA compressor, e.g. as described above with respect to FIG. 5. The device 600 may perform the method as described above with respect to FIGS. 2 to 5.

The methods and devices described above with respect to FIGS. 1 to 6 are based on a concept related to minimizing end to end latency. The concept may be described by the following issues: As a starting point use the Sample Based Jitter Buffer Management entity, usually used to solve jitter issue, in a context where there is no jitter, to diminish end to end latency. It is a system idea that is to enable a dynamic and adaptive scheduling of audio playout, SJBM & codec activities and audio DSP speech enhancement activities so that end to end latency is kept to the minimum during a VoIP call. The following facts can be observed: Scheduling of audio playout, SJBM pull, codec decoding and audio DSP speech enhancements are static and typically occur every 20 (or 40 ms). The SJBM time-scaling capabilities are only used to increase or decrease the amount of JBM buffering: they do not change neither the rate of playout nor the rate of SJBM pull activities nor the rate of codec decoding activities nor the rate at which data is exchanged with audio DSP. Methods and devices according to the disclosure enable a dynamic scheduling of audio activities, with a smooth and adaptive positioning/shifting of the activities that can happen at any point of time during a VoIP call. This dynamic, adaptive and smooth scheduling of audio activities during a VoIP call can be achieved by implementing the methods and devices described above with respect to FIGS. 1 to 6. Key items involve: Being able to measure how suboptimal the scheduling is; Being able to shift SJBM/codec activities on request, at any point of time during a VoIP call; Being able to shift smoothly/silently the audio activities without audio artifacts. The granularity of the whole system is important: the smaller the buffers used in between SJBM/codec subsystem and DSP/speech enhancement subsystem, for audio data exchange, the better end to end latency can be reduced. Lower end to end latency can be demonstrated by using methods and devices according to the disclosure with a modified SJBM, that provides improvements even in case there is no jitter at all. Prototyping has been done and has shown superior performance.

Figure 7:
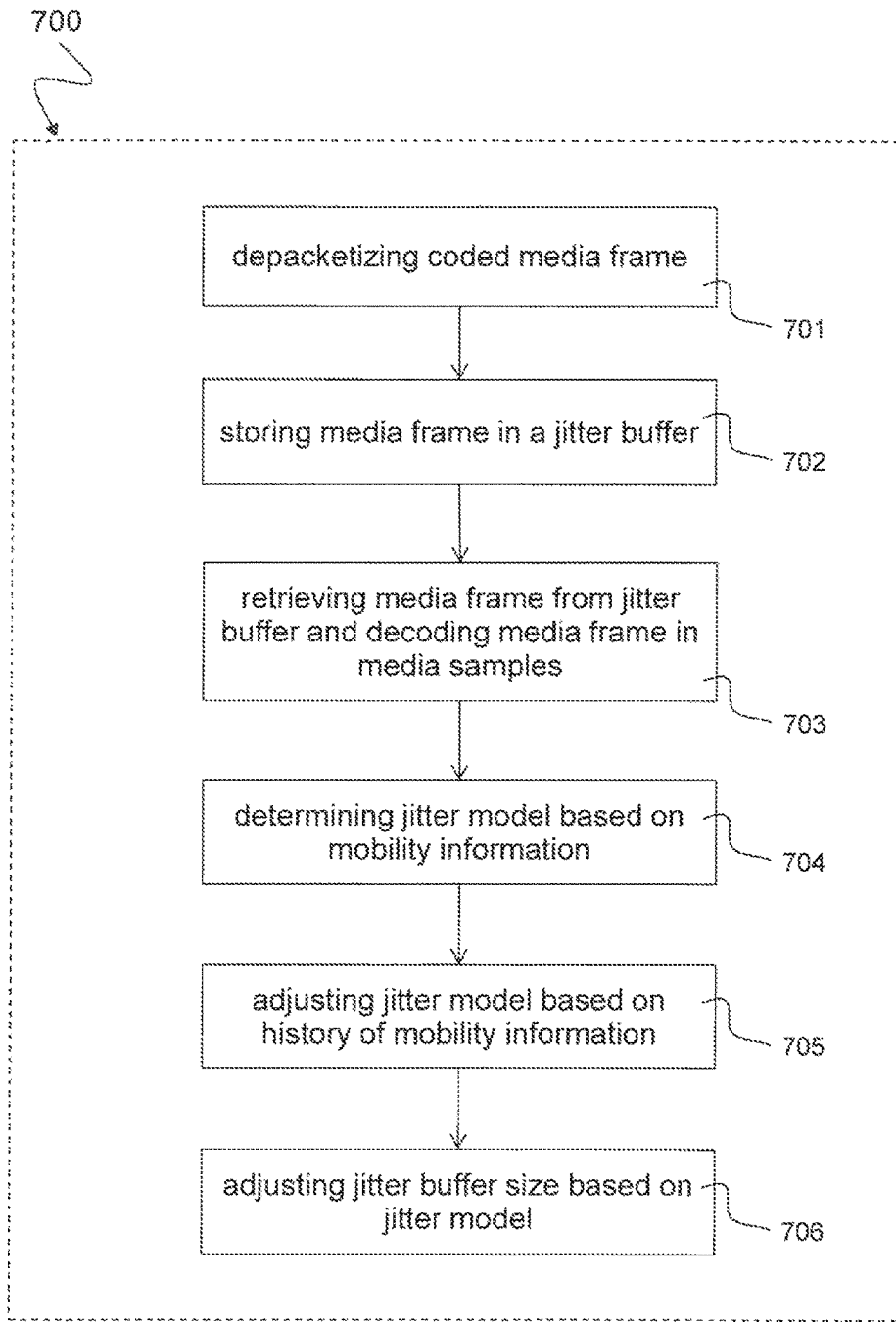
FIG. 7 is a schematic diagram of a method 700 for adjusting a size of a jitter buffer in a media processing circuit of a mobile terminal in accordance with the disclosure.

FIG. 7 is a schematic diagram of a method 700 for adjusting a size of a jitter buffer in a media processing circuit of a mobile terminal in accordance with the disclosure. The method 700 includes depacketizing 701 at least one coded media frame from a received radio signal. The method 700 includes storing 702 the depacketized at least one coded media frame in a jitter buffer. The method 700 includes retrieving 703 the at least one coded media frame from the jitter buffer and decoding the at least one coded media frame into media samples. The method 700 includes determining 704 a jitter model based on information indicating a mobility state of the mobile terminal. The method 700 includes adjusting 705 the jitter model based on a history of the information indicating the mobility state. The method 700 includes adjusting 706 a size of the jitter buffer based on the jitter model. The history of the information indicating the mobility state may include actual and past mobility state information and further information derived from that mobility state information, for example statistics. The history may be stored in a memory.

The information indicating the mobility state of the mobile terminal may include information on a speed of the mobile terminal. The information indicating the mobility state of the mobile terminal may include one or more of the following information related to the mobile terminal: speed or velocity information, location information, for example indoor or outdoor information, environment information, time information, change of velocity or acceleration information, information on the network the mobile terminal is connected to. Adjusting the size of the jitter buffer may be based on a network jitter estimated based on the information indicating the mobility state of the mobile terminal. The method 700 may further include estimating the network jitter as a cyclic function that may be derived from the information indicating the mobility state of the mobile terminal.

The basic principle of such method 700 may consist of detecting high mobility scenarios and modeling the jitter that is specific to these scenarios. This enables better JBM decisions leading to improved speech and/or video quality.

The following example illustrates the situation in the typical case of a 3GPP network, but it can be transferred to any networks with a media (voice or video) transmission and reception over packet switched networks. With LTE or 3G HSPA systems, when a user, for example on a highway, is moving from one eNodeB (or NodeB in 3G or base station in 2G terminology) to the other, the following steps occur: while being close to an eNode-B, the radio signal quality is good, whereas when moving away, the radio signal quality decreases leading to LTE or 3G HARQ retransmissions between the device and eNodeB to cope with signal quality deterioration. These retransmissions lead to increased network jitter. Then, by moving closer to a new eNodeB, the radio quality increases, leading to less and less HARQ retransmissions. That is, from a jitter point of view, the jitter is increasing and then decreasing and this phenomenon is repeated periodically.

By providing external information, such as speed, GPS information and/or radio technology in use to the JBM, such oscillating jitter behaviors can be detected such that it will be easier to predict network behavior in the coming short term future. This mechanism is not in contradiction with other JBM mechanisms, but is recommended to be used on top of existing ones to enable faster and better stabilization of JBM behavior in case of high mobility scenarios.

For example, smartphones, tablets and even more and more low-end devices may provide such speed and GPS information. This can also be enlarged to any embedded systems in cars with or without GPS. Methods as described in this disclosure thus may be suitable to improve JBM behavior in high mobility scenarios for a lot of devices.

Methods and devices according to the disclosure provide additional information to the JBM enabling to deal in a more efficient, faster and accurate way with high mobility scenarios. Hence, the JBM becomes context aware.

When detecting such use case, the amplitude and periodicity of jitter changes may be evaluated for efficiently setting the amount of buffering. This may limit the number of JBM adaptations required to deal with a jitter that may change permanently.

Methods and devices according to the disclosure improve VoLTE and VoIP speech quality in case of high mobility scenarios. Methods and devices according to the disclosure can also be applied to any video JBM. Thus, methods and devices according to the disclosure are not limited to audio and may improve video quality as well.

Methods and devices according to the disclosure can be applied in both, audio and video conversational services and audio and video streaming services.

Figure 8:
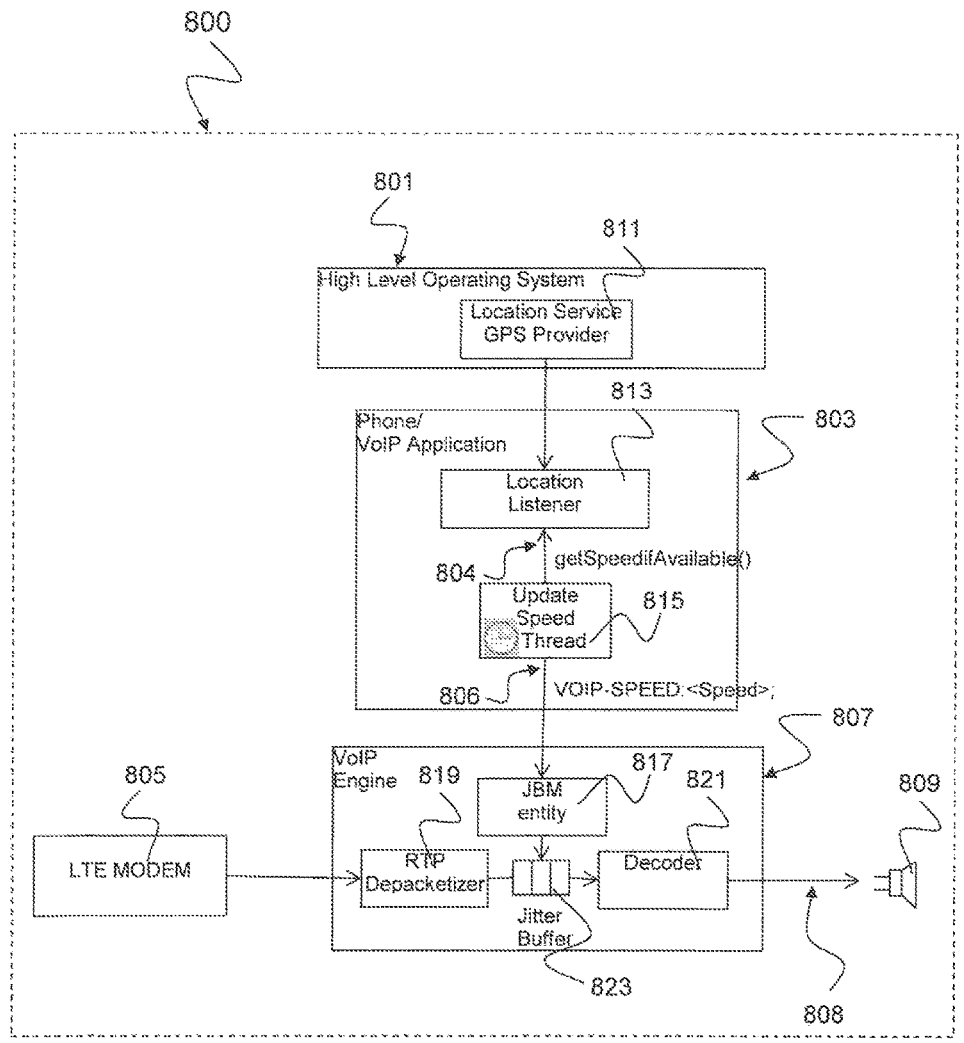
FIG. 8 is a schematic diagram of a media processing system 800 in accordance with the disclosure.

FIG. 8 is a schematic diagram of a media processing system 800 in accordance with the disclosure. The illustrated diagram describes how the speed information 806 may be retrieved from the high level operating system 801 to the Jitter Buffer Management entity 817.

The media processing system 800 may include a high level operating system 801, a phone/VoIP application 803, a VoIP engine 807, an LTE modem 805 and a playout device 809 such as a loudspeaker or a screen. The VoIP engine 807 may be coupled in the media path between the LTE modem 805 and the playout device 809. The phone/VoIP application 803 may be coupled in the management path between the high level operating system 801 and the VoIP engine 807. The high level operating system 801 may include a location service GPS provider 811 for providing mobility information such as GPS information of the mobile device to a location listener 813 implemented in the phone/VoIP application 803. An Update Speed Thread 815 may be implemented in the phone/VoIP application 803 to query 804 the mobility information from the location listener 813.

The VoIP engine 807 may include an RTP depacketizer for depacketizing RTP packets received from the LTE modem 805, a jitter buffer 823 for storing the depacketized RTP packets and a decoder 821 for decoding packets retrieved from the jitter buffer 823 into media samples 808, e.g. audio or video, that may be played out by the playout device 809. The VoIP engine 807 may further include a jitter buffer management entity 817 for controlling a size of the jitter buffer 823. The jitter buffer management entity 817 may receive the mobility information 806 from the update speed thread 815 of the phone/VoIP application 803 and may adjust the size of the jitter buffer 823 based on that mobility information as described herein.

Once a high mobility use case is detected by the JBM 817, the probability of an oscillating jitter (including cycles of jitter increase and cycles of jitter decrease) is very high. This hypothesis may be checked and, if confirmed, used to derive more appropriate settings for the JBM 817 that may enable an improved speech quality.

FIG. 8 is representative of a setup with a packet based jitter, but a generalization of such setup may include any jitter after the decoder 821. The different blocks used by the JBM 817 to deal with high mobility scenarios are described below with respect to FIG. 9.

In FIG. 8, the connection between the high level OS framework 801 including a location service GPS provider 811 that may be used for providing the GPS data of the mobile device and the VoIP engine 807 is enabled. The information from the location service GPS provider 811, i.e. the GPS data or mobility data of the mobile device is available to the VoIP engine 807.

For improving the JBM settings and behavior for better speech quality, information from the field, e.g. by performing VoIP drive tests, may be collected in order to optimize using the speed information.

Figure 9:
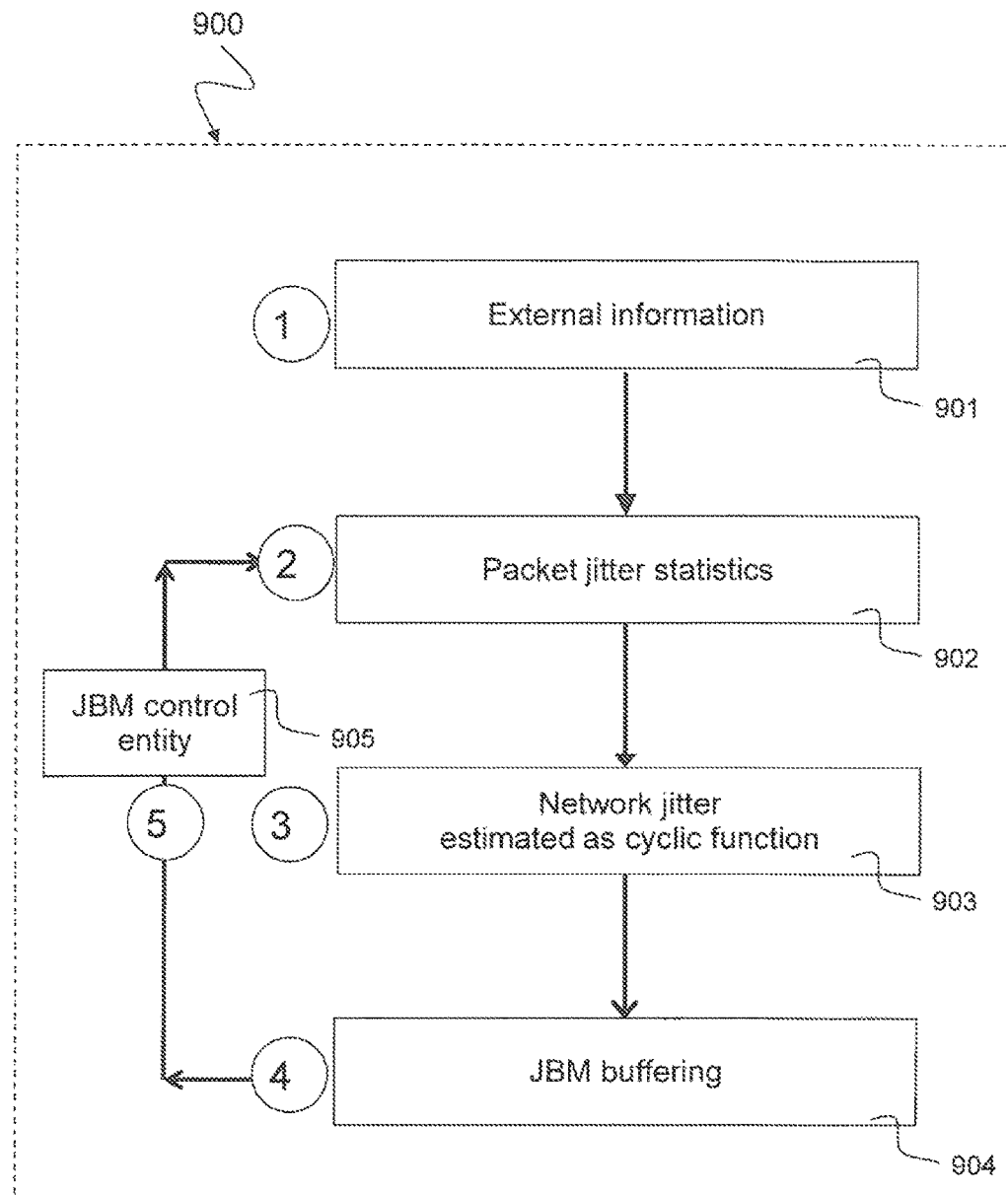
FIG. 9 is a schematic diagram illustrating activities 900 of a jitter buffer management control entity 905 in accordance with the disclosure.

FIG. 9 is a schematic diagram illustrating activities 900 of a jitter buffer management control entity 905 in accordance with the disclosure. In a first block "1" 901 external information is acquired. In a second block "2" 902 packet jitter statistics are evaluated. In a third block "3" 903 network jitter is estimated as a cyclic function. In a fourth block "4" 904 Jitter Buffer Management (JBM) buffering is performed. In a fifth block "5" the JBM control entity 905 receives information from the fourth block "4" 904 JBM buffering and updates packet jitter statistics of the second block 902. The five blocks or activities may be performed as described in the following.

In block 1 901 the information enabling detection of high mobility use cases is provided by external components to the JBM entity (denoted as JBM control entity 905 in FIG. 9) that may correspond to the JBM entity 817 as described above with respect to FIG. 8.

In block 2 902 packets delay statistics are collected to estimate the jitter model. In static and pedestrian scenarios, a relatively small sliding window (of a few seconds) or first order filter may be used to estimate current jitter. Using bigger sliding windows may result in additional latency when reacting to jitter changes. With such low mobility scenarios usually no significant periodic jitter phenomena can be experienced.

When entering high mobility scenarios, a bigger sliding window may be used enabling to collect enough statistics to describe the periodic jitter phenomena. The depth of the sliding window may be adjusted as well depending on the speed evolutions.

In block 3 903 a model corresponding to this oscillating jitter behavior may be derived. Network jitter as a function of time may be approximated as a cyclic function characterized by its amplitude and period. A simple model for cyclic jitter variations approximation is amplitude and period. For example, this model can be easily extended to model sub-phenomena or sub-cycles.

The two most important parameters estimated at block 3 903 may be jitter amplitude and jitter period. Jitter amplitude is the difference between packets with highest transfer times and packets with lowest transfer times, where transfer times may typically depend on the number of retransmissions to make a transmission successful. Jitter period is the time elapsed between two peaks of jitter. This enables to adjust the depth of the sliding window used to collect statistics.

Jitter amplitude may further be used at block 4 904. Jitter period may be used to further refine the processing at block 2 902. If the statistics collected do not match any cyclic jitter function, the default JBM settings may be further used.

The mechanism described in FIG. 9 may provide an improvement of an existing system, e.g. for triggering specific processing if and only if cyclic jitter patterns are detected.

In block 4 904, based on this network jitter model derived in block 3 903, the amount of UE jitter buffering may be derived to enable dealing, for example once for all, with all cyclic variations in a way that requires a minimal amount of JBM adaptations, i.e. avoiding recurrent increase and decrease of JBM buffering, and an amount of buffering, that enables to cope with the maximum tolerated losses. In one example, an AMR codec can tolerate at maximum 1 percent losses without impact on speech quality. Other codecs like ILBC can tolerate up to 5 percent losses. Where the amount of buffering to cope with jitter is set at the minimum value enabling to process e.g. 99 percent of packet delays, no extra latency by buffering may be used on top of what is really required to reach this target.

In block 5 905, as long as the high mobility situation lasts, evaluating and adjusting the model of cyclic network jitter may be performed. Otherwise, when leaving the high mobility situation, default settings for jitter monitoring may be restored. A much smaller statistical sliding window suitable for fast reaction to network jitter changes may be used. This way, JBM settings may be derived that may be very stable in these highly unstable jitter scenarios.

JBM convergence issues and latency issues associated to every JBM adaptations that are typical in high mobility use cases can be avoided. A better speech quality can be ensured. Lower latency may lead to an improved interactivity between users in a call. Lower amount of JBM adaptations may lead to a reduction of packet losses and/or a reduction of speech frames compressions and expansions that are associated to JBM adaptations.

Figure 10:
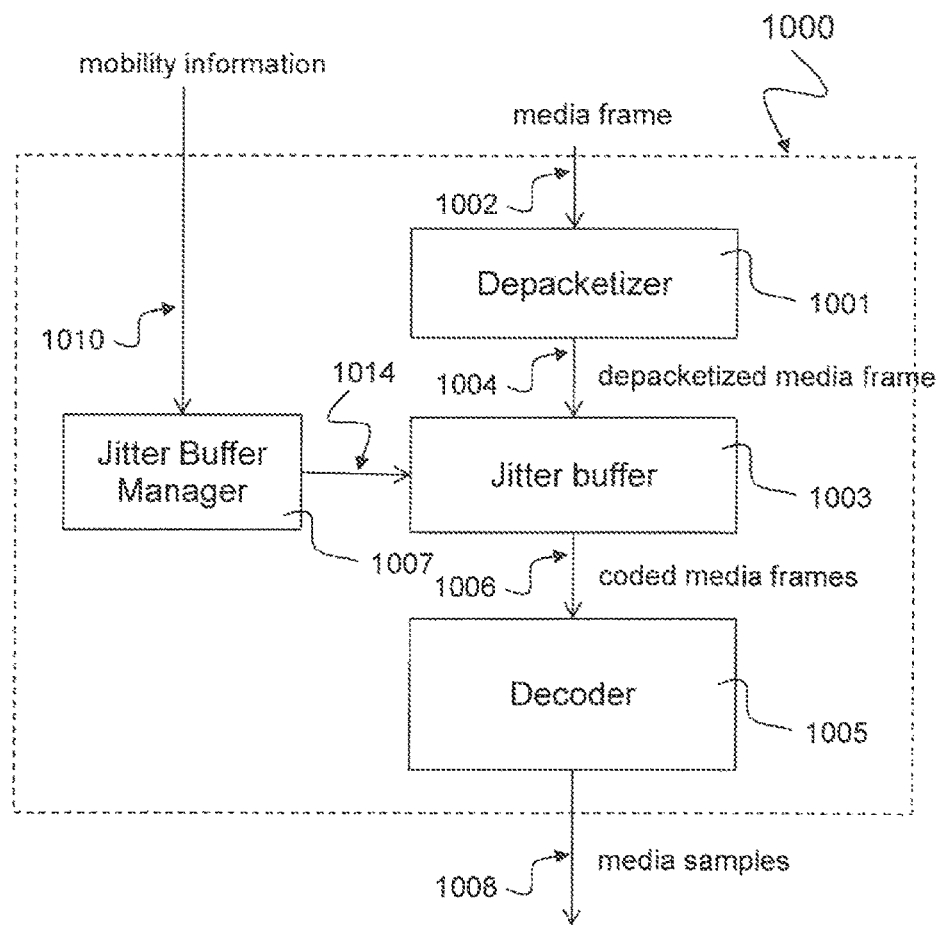
FIG. 10 is a schematic diagram of a media processing circuit 1000 for use in a mobile terminal in accordance with the disclosure.

FIG. 10 is a schematic diagram of a media processing circuit 1000 for use in a mobile terminal in accordance with the disclosure.

The media processing circuit 1000 includes a depacketizer 1001, a jitter buffer 1003, a decoder 1005 and a jitter buffer manager also referred to as jitter buffer management entity 1007. The depacketizer 1001 is configured to depacketize at least one coded media frame 1002 from a received radio signal. The jitter buffer 1003 is configured to store the depacketized at least one coded media frame 1004. The decoder 1005 is configured to retrieve the at least one coded media frame 1006 from the jitter buffer 1003 and to decode the at least one coded media frame 1006 into media samples 1008. The jitter buffer management entity 1007 is configured to determine a jitter model based on information 1010 indicating a mobility state of the mobile terminal, to adjust the jitter model based on a history of the information indicating the mobility state and to adjust a size of the jitter buffer 1003 based on the jitter model, e.g. as described above with respect to FIGS. 8 and 9.

The jitter buffer management entity 1007 may include an interface to a location service providing entity to receive the information 1010 indicating the mobility state of the mobile terminal, for example as described above with respect to FIG. 8. The jitter buffer management entity 1007 may be configured to adjust the size of the jitter buffer 1003 based on at least one of the following information related to the mobile terminal: speed or velocity information, location information, environment information, time information, change of velocity or acceleration information, for example as described above with respect to FIG. 8.

The media processing circuit 1000 may implement the method 700 and the techniques as described above with respect to FIGS. 7 to 9. The methods and devices described with respect to FIGS. 7 to 12 may be described based on a concept related to improved quality (speech or video) in case of VoIP or multimedia over IP high mobility use cases. The concept includes the following issues: A first issue may be detecting that the mobile terminal is in a mobility use case. This can be done thanks to e.g. a GPS or any other positioning system. A second issue relates to how to derive a useful model for jitter management in case a high mobility scenario may be detected. This model will enable improved speech quality in case of mobility use cases. Key issues may involve: Detecting mobility use cases; Building a Jitter model specific to mobility use cases that will enable better jitter predictions; Using this model for jitter management so that it enables improved speech quality during mobility use cases; Dynamically updating the jitter model during the high mobility use case; Using a full framework or system description for dealing with mobility use cases and improving speech quality for voice or video over IP communications. Then, different techniques may be applied to retrieve information from the modem to improve the accuracy of the jitter model and to enable better anticipation and predictions, e.g. by predicting the jitter behavior in the (short term) future.

Figure 11:
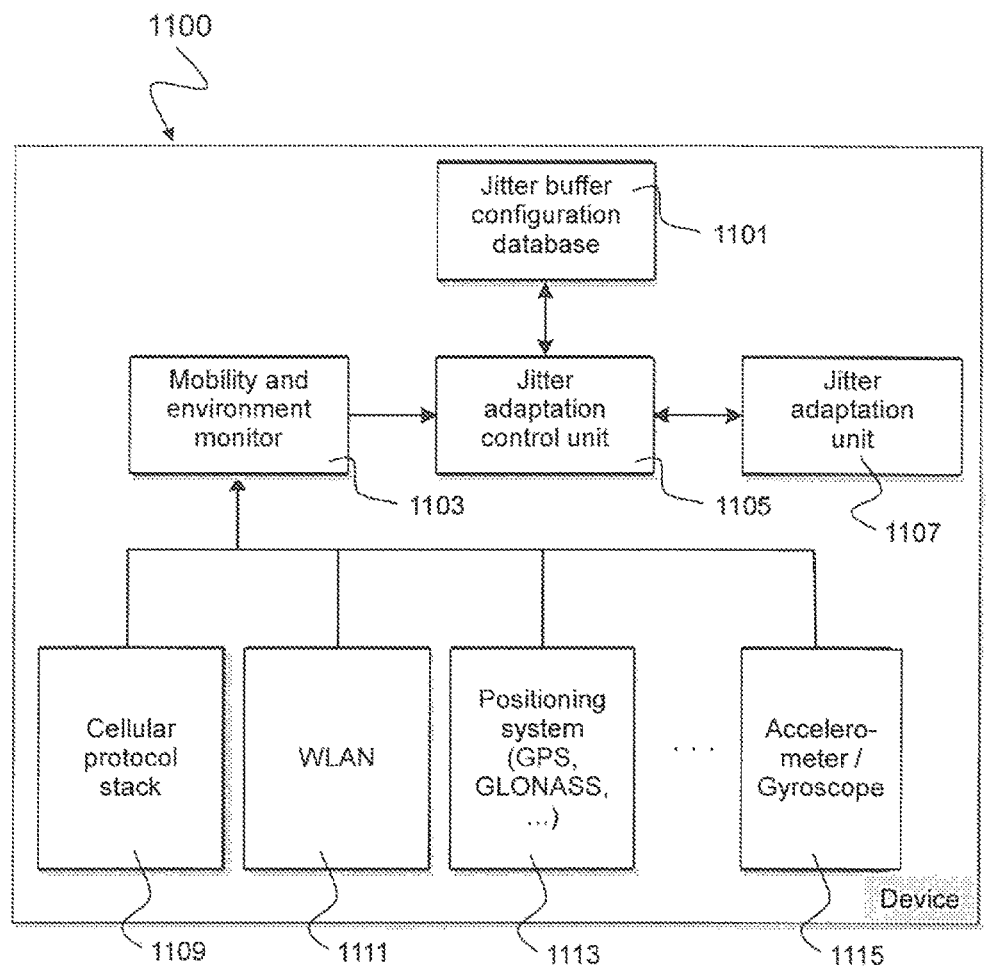
FIG. 11 is a schematic diagram of a jitter buffer configuration device 1100 in accordance with the disclosure.

FIG. 11 is a schematic diagram of a jitter buffer configuration device 1100 in accordance with the disclosure. The jitter buffer configuration device 1100 may correspond to the jitter buffer manager 1007 described above with respect to FIG. 10. The jitter buffer configuration device 1100 comprises a jitter adaptation control unit 1105 (control part), a jitter adaptation unit 1107 (execution part enforcing the decision taken by the jitter adaptation control unit), a mobility and environment monitor 1103, a jitter buffer configuration data base 1101, a cellular protocol stack 1109, a WLAN 1111, a positioning system 1113 such as GPS, GLONASS, etc., an accelerometer or gyroscope 1115 and further units (not depicted in FIG. 11).

The mobility and environment monitor 1103 may receive information from the various submodules, i.e. from the cellular protocol stack 1109, the WLAN 1111, the positioning system 1113, the accelerometer or gyroscope 1115 and further units. The mobility and environment monitor 1103 may determine an environment and mobility descriptor based on information from the different modules 1109, 1111, 1113, 1115 (cellular protocol stack, WLAN, GNSS, accelerometer, etc.). The environment and mobility descriptor can determine the location, the mobility type (pedestrian, car, train, plane, etc.), the environment type (indoor, outdoor urban, outdoor non-urban, etc.), the radio configuration type (cellular technology, radio bearer type, etc.).

The environment and mobility descriptor may be provided to the jitter adaption control unit 1105. The JBM adaptation control unit 1105 can do some statistics on the JBM size and number of adaptations in a specific environment/mobility. It can then determine the optimal configuration for this type of environment and store it. Once the same environment and mobility descriptor is given to jitter adaptation unit 1107, the optimal configuration can then be applied. No adaptation may be performed as long as there is no environment/mobility change. This may avoid multiple adaptation in case of jitter hence reduce impact on voice quality.

In the following, an example of the jitter buffer manager 1007 is described that may correspond to the jitter buffer configuration device 1100 described with respect to FIG. 11. The jitter buffer manager 1007 may use cellular information to anticipate JBM adaptation. The CPS (Cellular Protocol Stack) component 1109 can provide information such as: handover rate/handover type, handover interruption time, trigger for measurement (potentially resulting to handover). etc. The handover corresponds to network control, so the network may or may not trigger the handover. The right configuration will need to be defined to avoid too frequent JBM adaption if no handover is triggered. The CPS component 1109 can further provide information on statistics on reception rate/network retransmission, i.e. how many data was received on time, 1reTX (first repeat of transmission), 2reTX (second repeat of transmission).

Based on this information the JBM adaption control unit 1105 can determine if an adaptation is required or not and, if necessary, what kind of adaption is required. For example, in the case of an HO (handover), a burst of data may come after the handover completion, but this may not necessarily influence the statistics, as it is a punctual event.

Typically, before triggering a Hard HO, the network is waiting for a UE Measurement Report (MR) associated to a specific event. After this MR is processed by the network, there will typically be an interruption time followed by a bursty delivery of the packets that could not be delivered by the network during the interruption time (if the radio bearer is configured in Acknowledged Mode). By notifying the JBM as well, the JBM can anticipate and setup in a faster way a configuration that will help handling the audio play out during and after HO more smoothly. The periodicity of handover requests may help to determine the periodicity of the jitter which is a very useful information for the JBM. Based on the Protocol Stack configuration, it is possible to know in advance the maximum delay related to e.g. HARQ retransmissions, which will relate to the typical jitter experienced on a VoLTE network.

In the following, a further example of the jitter buffer manager 1007 is described that may correspond to the jitter buffer configuration device 1100 described with respect to FIG. 11. The jitter buffer manager 1007 may apply low level/high level adaptation based on radio link jitter and core network jitter. The contributor to the jitter can be split into jitter related to radio link and jitter related to core network.

The contribution of the radio link to the global jitter can be well estimated by the UE based on the HARQ statistics. The UE can determine the number of HARQ ACK/NACK for DL (downlink) data. In an exemplary configuration there is in average 8 ms between two transmissions. The jitter buffer adaption unit 1105 can then control the jitter buffer size and the playout time (or audio DSP for playout) based on the jitter statistic based on RTP timestamp and jitter based on radio link. The benefit of this solution is the following: A faster adaptation to the changing radio condition based on radio level statistics (more frequent than RTP based statistic); and a jitter buffer size management based on core network jitter without unnecessary adaptation due to changing radio condition. Hence, much more statistics can be collected (for example every 8 ms at MAC level instead of every 20 or 40 ms at RTP level). Therefore, more information can be obtained, more statistics can be obtained resulting in a more educated decision more quickly. The exact breakdown may be known, i.e. how many tx (transmissions) without retx (retransmission), with 1 retx, with 2 retx, etc. This is a very accurate picture of what is going on at the radio level and what is driving the radio jitter helping the JBM 1007 to take the best decision.

Figure 12:
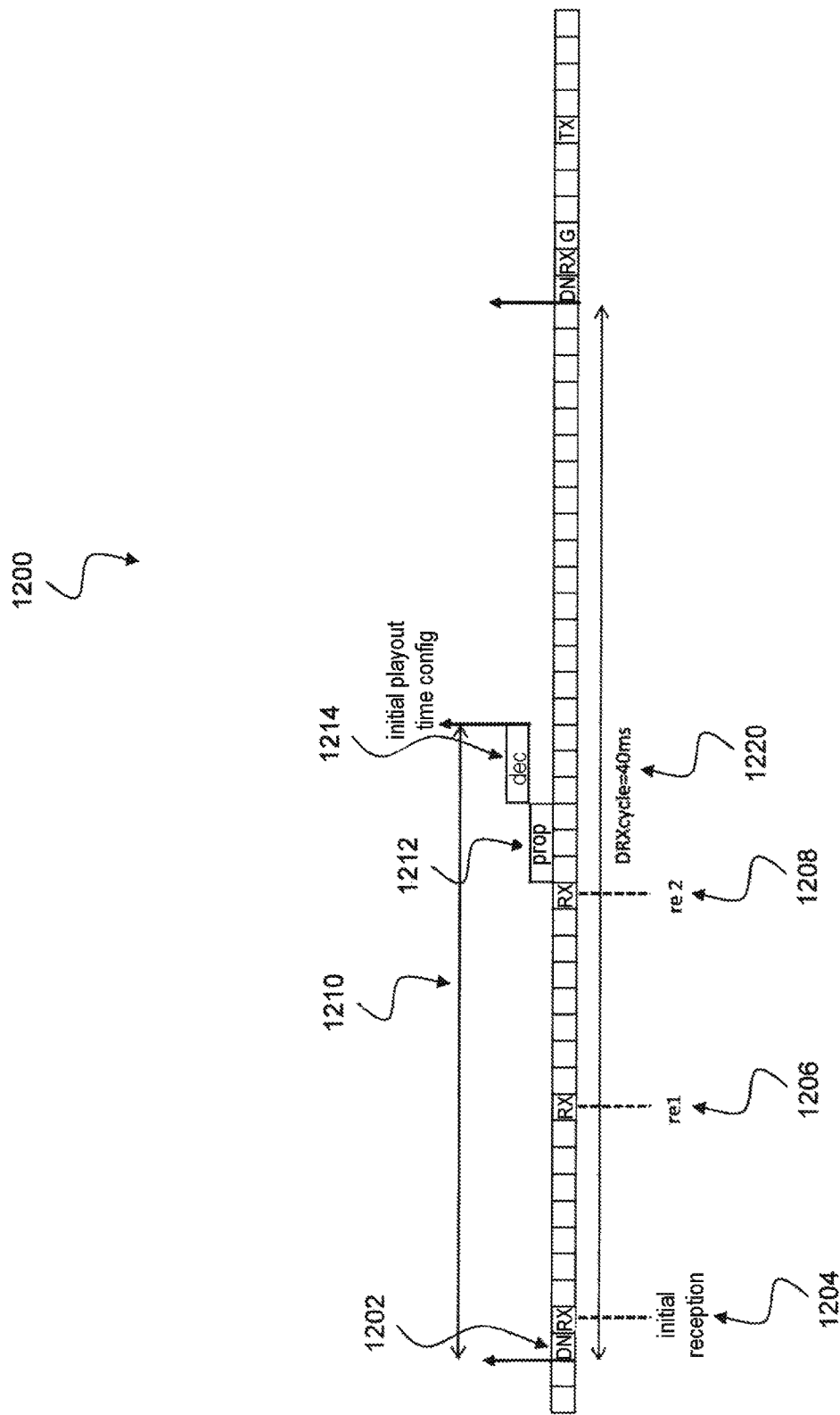
FIG. 12 is a schematic diagram of a media frame 1200 in accordance with the disclosure.

FIG. 12 is a schematic diagram of a media frame 1200 in accordance with the disclosure. The media frame 1200 may include a plurality of DRX cycles, each one having an exemplary duration of 40 ms. The initial playout time 1210 may include initial reception period 1204 and optionally first retransmission period 1206, second retransmission period 1208 and further retransmission periods (not depicted in FIG. 12).

In the following, a further example of the jitter buffer manager 1007 is described. The jitter buffer manager 1007 may correspond to the jitter buffer configuration device 1100 described above with respect to FIG. 11. JBM 1007 may be aligned to cellular RX (receive) window. To speed up the initial configuration, the position of the RX slots 1204, 1206, 1208 can be used to determine the playout interrupt position. As described in the diagram of FIG. 12, once the dedicated EPS bearer for the IMS call is setup, the position of the "onDurationStart" 1202 and the "onDurationTimer" value is known. The reception of the data shall happen in the "onDurationPeriod". In case of reception issue, the network may retransmit several times, leading to a delay to receive the audio frame. As initial configuration 1210, the playout time can then be initialized based on the position of the "onDurationStart" 1202 and the internal processing time, i.e. propagation 1212, RTP decapsulation, decoding 1214. To be on the safe side and directly accommodate network retransmission, the retransmission 1206, 1208 can be considered when configuring the initial playout time. This enables starting directly with a configuration able to cope with the maximum number of HARQ (Hybrid Automatic Repeat Request) retransmissions in an optimal way. Merely adding the JBM buffering may be sufficient when assuming that there are no core network congestion issues that would result in core network jitter on top of radio network jitter.

Methods and devices according to the disclosure provide an improved jitter buffer management to overcome issues related to discrepancies between information collected in a past short term versus network behavior in a future short term. The following issues can be overcome by applying methods and devices according to the disclosure: Convergence time to reach a stable state (in terms of JBM settings and especially in terms of JBM buffering), latency to exit from some stable states and to cope with new variations (as a consequence of a new network situation and behavior) and oscillating behaviors without converging to a correct and stable state, in case of periodical phenomena.

Methods and devices according to the disclosure provide a mechanism to deal with the following case where network jitter is periodically and regularly increasing and decreasing. The JBM will follow this behavior with some latency leading to suboptimal procedure and may never converge to a stable state. This may lead to either more buffering being used than necessary or periodical audio distortions in case the JBM tries to follow very quickly with minimal latency the network variations. By adjusting the jitter buffer size based on mobility information, methods and devices according to the disclosure may drive the JBM to a stable state.

The methods and devices according to the disclosure provide a mechanism to predict with additional information and increased accuracy some scenarios that are difficult to cope with for existing JBMs implementations. The methods and devices described here provide improved JBM performances, in particular in case of network jitter corresponding to oscillating behaviors. JBM performances are improved in high mobility scenarios for all media (audio and video) over IP and for VoLTE usages in cars, trains, buses, etc. leading to regular and fast movement (e.g. faster than a moving pedestrian) of the device in use.

The present disclosure may also support a computer program product including computer executable code or computer executable instructions that, when executed, causes at least one computer to execute the performing and computing steps described herein, in particular the methods 200 and 700 as described above with respect to FIGS. 2 and 7 and the techniques described above with respect to FIGS. 1 to 10. Such a computer program product may include a readable storage medium storing program code thereon for use by a computer. The program code may perform the method 200 as described above with respect to FIG. 2 or the method 700 as described above with respect to FIG. 7.

EXAMPLES

The following examples pertain to further embodiments. Example 1 is a method for controlling end-to-end latency between receiving and processing audio frames, the method comprising: receiving a data packet comprising at least one coded audio frame; storing the received data packet in a packet buffer; retrieving the received data packet from the packet buffer and decoding the at least one coded audio frame into audio samples; and processing the audio samples, wherein a scheduling of retrieving the received data packet from the packet buffer and decoding the at least one coded audio frame is based on a target criterion with respect to audio quality of the audio samples and latency between receiving the data packet and processing the audio samples, and wherein the scheduling is dynamically and smoothly shifted in time in order to avoid audio distortions.

In Example 2, the subject matter of Example 1 can optionally include that scheduling of retrieving the received data packet from the packet buffer and decoding the at least one coded audio frame is based on time-scaling the at least one decoded audio frame in order to move a processing of the received data packet in an optimal position with respect to a minimal latency.

In Example 3, the subject matter of Example 2 can optionally include that time-scaling the at least one decoded audio frame comprises at least one of: frame compression for reducing the latency between receiving the data packet and processing the audio samples, frame expansion for increasing the latency between receiving the data packet and processing the audio samples, and idle activity with respect to frame compression and frame expansion for keeping the latency between receiving the data packet and processing the audio samples.

In Example 4, the subject matter of any one of Examples 2 to 3 can optionally include that the time-scaling is used for shifting the scheduling in order to modify a position of the at least one decoded audio frame.

In Example 5, the subject matter of any one of Example 2 to 4 can optionally include that time-scaling is based on one of speech frame compression and speech frame expansion.

In Example 6, the subject matter of any one of Examples 1 to 5 can optionally include determining an optimal scheduling based on at least one of the following information: statistics about latency between received data and played-out data, modem statistics based on at least one of reception rate and retransmission rate.

In Example 7, the subject matter of any one of Examples 1 to 6 can optionally include that the data packet is part of a stream of asynchronously received data packets.

In Example 8, the subject matter of Example 7 can optionally include determining statistics of the latency between receiving a respective data packet of the stream of data packets and processing the audio samples of the respective data packet; and using the statistics for the scheduling.

In Example 9, the subject matter of any one of Examples 1 to 8 can optionally include that retrieving the received data packet from the packet buffer and decoding the at least one coded audio frame and processing the audio samples is based on a master clock.

In Example 10, the subject matter of any one of Examples 1 to 9 can optionally include that scheduling of retrieving the received data packet from the packet buffer and decoding the at least one coded audio frame is performed by adjusting at least one of: clocking of retrieving the received data packet from the packet buffer and decoding the at least one coded audio frame, and clocking of processing the audio samples.

In Example 11, the subject matter of any one of Examples 1 to 10 can optionally include determining a latency between the received data packet and the processed audio samples; determining an audio quality of the audio samples; and scheduling retrieving the received data packet from the packet buffer and decoding the at least one coded audio frame such that the audio quality is above a first threshold and the latency between receiving the data packet and processing the audio samples is below a second threshold.

In Example 12, the subject matter of Example 11 can optionally include that processing the audio samples comprises: initializing a playout time of the audio samples based on at least one of the following: a position indicating a start of the audio frame, a number of retransmissions of the audio frame, an internal processing time, a retransmission of the data packet comprising the audio frame.

Example 13 is a device for controlling end-to-end latency between receiving and processing audio frames, the device comprising: a packet buffer configured to receive a data packet comprising at least one coded audio frame; a decoder configured to retrieve the received data packet from the packet buffer and to decode the at least one coded audio frame into audio samples; an audio processor configured to process the audio samples; and a scheduler configured to schedule retrieving the received data packet from the packet buffer and decoding of the at least one coded audio frame based on a target criterion with respect to audio quality of the audio samples and latency between receiving the data packet by the packet buffer and processing the audio samples by the audio processor, wherein the scheduler (607) is configured to dynamically and smoothly shift the scheduling in time in order to avoid audio distortions.

In Example 14, the subject matter of Example 13 can optionally include an audio buffer coupled between the decoder and the audio processor, wherein the decoder is configured to store the audio samples in the audio buffer and the audio processor is configured to retrieve the audio samples from the audio buffer.

In Example 15, the subject matter of Example 14 can optionally include that the scheduler is configured to adjust at least one of an access rate of the decoder for storing the audio samples in the audio buffer and an access rate of the audio processor for retrieving the audio samples from the audio buffer, an access rate of pull requests to the audio buffer.

In Example 16, the subject matter of Example 15 can optionally include that the scheduler is configured to adjust the access rate of the decoder based on a first clock and the access rate of the audio processor based on second clock, wherein the first clock and the second clock are derived from a master clock or any other synchronization mechanism.

In Example 17, the subject matter of any one of Examples 13 to 16 can optionally include that the scheduler is configured to schedule retrieving the received data packet from the packet buffer and decoding of the at least one coded audio frame based on adjusting a time-scaling of the decoder for decoding the at least one coded audio frame.

In Example 18, the subject matter of any one of Examples 13 to 17 can optionally include that the decoder comprises at least one of a speech decoder and a speech time scaler.

Example 19 is a method for adjusting a size of a jitter buffer in a media processing circuit of a mobile terminal, the method comprising: depacketizing at least one coded media frame from a received radio signal; storing the depacketized at least one coded media frame in a jitter buffer; retrieving the at least one coded media frame from the jitter buffer and decoding the at least one coded media frame into media samples; determining a jitter model based on information indicating a mobility state of the mobile terminal; adjusting the jitter model based on a history of the information indicating the mobility state; and adjusting a size of the jitter buffer based on the jitter model.

In Example 20, the subject matter of Example 19 can optionally include that the information indicating the mobility state of the mobile terminal comprises at least one of the following information related to the mobile terminal: speed or velocity information, location information, environment information, time information, change of velocity or acceleration information.

In Example 21, the subject matter of any one of Examples 19 to 20 can optionally include adjusting the size of the jitter buffer based on a network jitter estimated based on the information indicating the mobility state of the mobile terminal.

In Example 22, the subject matter of Example 21 can optionally include estimating the network jitter as a cyclic function derived from the information indicating the mobility state of the mobile terminal.

Example 23 is a media processing circuit for use in a mobile terminal, the media processing circuit comprising: a depacketizer configured to depacketize at least one coded media frame from a received radio signal; a jitter buffer configured to store the depacketized at least one coded media frame; a decoder configured to retrieve the at least one coded media frame from the jitter buffer and to decode the at least one coded media frame into media samples; and a jitter buffer management entity configured to determine a jitter model based on information indicating a mobility state of the mobile terminal, to adjust the jitter model based on a history of the information indicating the mobility state and to adjust a size of the jitter buffer based on the jitter model.

In Example 24, the subject matter of Example 23 can optionally include that the jitter buffer management entity comprises an interface to a location service providing entity to receive the information indicating the mobility state of the mobile terminal.

In Example 25, the subject matter of any one of Examples 23 to 24 can optionally include that the jitter buffer management entity is configured to adjust the size of the jitter buffer based on at least one of the following information related to the mobile terminal: speed or velocity information, location information, environment information, time information, change of velocity or acceleration information.

Example 26 is a computer readable medium on which computer instructions are stored which when executed by a computer, cause the computer to perform the method of one of Examples 1 to 12 or the method of one of Examples 19 to 22.

Example 27 is a device for controlling end-to-end latency between receiving and processing audio frames, the device comprising: receiving means for receiving a data packet comprising at least one coded audio frame; storing means for storing the received data packet in a packet buffer; retrieving means for retrieving the received data packet from the packet buffer and decoding means for decoding the at least one coded audio frame into audio samples; and processing means for processing the audio samples, wherein a scheduling of retrieving the received data packet from the packet buffer and decoding the at least one coded audio frame is based on a target criterion with respect to audio quality of the audio samples and latency between receiving the data packet and processing the audio samples.

In Example 28, the subject matter of Example 27 can optionally include scheduling means for scheduling of retrieving the received data packet from the packet buffer and decoding the at least one coded audio frame based on time-scaling the at least one coded audio frame.

In Example 29, the subject matter of Example 28 can optionally include that the scheduling means is configured to time-scale the at least one coded audio frame based on re-coding the at least one coded audio frame.

Example 30 is a system for controlling end-to-end latency between receiving and processing audio frames, the system comprising: a packet buffer configured to receive a data packet comprising at least one coded audio frame; a decoder configured to retrieve the received data packet from the packet buffer and to decode the at least one coded audio frame into audio samples; an audio processor configured to process the audio samples; and a scheduler configured to schedule retrieving the received data packet from the packet buffer and decoding of the at least one coded audio frame based on a target criterion with respect to audio quality of the audio samples and latency between receiving the data packet by the packet buffer and processing the audio samples by the audio processor.

In Example 31, the subject matter of Example 30 can optionally include an audio buffer coupled between the decoder and the audio processor, wherein the decoder is configured to store the audio samples in the audio buffer and the audio processor is configured to retrieve the audio samples from the audio buffer.

In Example 32, the subject matter of Example 30 can optionally include that the system is an on-chip system.

Example 33 is a device for adjusting a size of a jitter buffer in a media processing circuit of a mobile terminal, the device comprising: means for depacketizing at least one coded media frame from a received radio signal; means for storing the depacketized at least one coded media frame in a jitter buffer; means for retrieving the at least one coded media frame from the jitter buffer and decoding the at least one coded media frame into media samples; means for adjusting a size of the jitter buffer based on information indicating a mobility state of the mobile terminal.

In Example 34, the subject matter of Example 33 can optionally include that the information indicating the mobility state of the mobile terminal comprises information on a speed of the mobile terminal.

Example 35 is a media processing system for use in a mobile terminal, the media processing system comprising: a depacketizer configured to depacketize at least one coded media frame from a received radio signal; a jitter buffer configured to store the depacketized at least one coded media frame; a decoder configured to retrieve the at least one coded media frame from the jitter buffer and to decode the at least one coded media frame into media samples; and a jitter buffer management entity configured to adjust a size of the jitter buffer based on information indicating a mobility state of the mobile terminal.

In Example 36, the subject matter of Example 35 can optionally include that the jitter buffer management entity comprises an interface to a location service providing entity to receive the information indicating the mobility state of the mobile terminal.

In Example 37, the subject matter of Example 36 can optionally include that the system is an on-chip system.

In Example 38, the subject matter of any one of Examples 23 to 25 can optionally include that the jitter buffer management entity is coupled to a mobility monitor for receiving information about at least one of the following: location, mobility type, environment type, radio configuration type.

In Example 39, the subject matter of any one of Examples 23 to 25 can optionally include that the jitter buffer management entity is coupled to a cellular protocol stack for receiving information about at least one of the following: handover rate, handover type, handover interrupt time, trigger for measurement, statistics on reception rate, statistics on network retransmission.

In Example 40, the subject matter of any one of Examples 23 to 25 can optionally include that the jitter buffer management entity is configured to adjust a size of the jitter buffer based on received information about at least one of jitter related to radio link and jitter related to core network.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A method for controlling end-to-end latency between receiving and processing audio frames, the method comprising:
    receiving a data packet comprising at least one coded audio frame;
    storing the received data packet in a packet buffer;
    retrieving the received data packet from the packet buffer and decoding the at least one coded audio frame into audio samples;
    processing the audio samples;
    determining a latency between the received data packet and the processed audio samples;
    determining an audio quality of the audio samples; and
    scheduling retrieving the received data packet from the packet buffer and decoding the at least one coded audio frame when the audio quality is above a first threshold and the latency between receiving the data packet and processing the audio samples is below a second threshold, and
    wherein the scheduling is shifted in time in order to avoid audio distortions.

2. The method of claim 1, wherein scheduling of retrieving the received data packet from the packet buffer and decoding the at least one coded audio frame is based on time-scaling the at least one decoded audio frame in order to move a processing of the received data packet to a position for minimal latency.

3. The method of claim 2, wherein time-scaling the at least one decoded audio frame comprises at least one of:
    frame compression for reducing the latency between receiving the data packet and processing the audio samples,
    frame expansion for increasing the latency between receiving the data packet and processing the audio samples, and
    idle activity with respect to frame compression and frame expansion for keeping the latency between receiving the data packet and processing the audio samples.

4. The method of claim 2, wherein the time-scaling is used for shifting the scheduling in order to modify a position of the at least one decoded audio frame.

5. The method of claim 2, wherein time-scaling is based on one of speech frame compression and speech frame expansion.

6. The method of claim 1, comprising:
    determining the scheduling based on at least one of the following information:
        statistics about latency between received data and played-out data,
        modem statistics based on at least one of reception rate and retransmission rate.

7. The method of claim 1, wherein the data packet is part of a stream of asynchronously received data packets.

8. The method of claim 7, further comprising:
    determining statistics of the latency between receiving a respective data packet of the stream of data packets and processing the audio samples of the respective data packet; and
    using the statistics for the scheduling.

9. The method of claim 1, wherein retrieving the received data packet from the packet buffer and decoding the at least one coded audio frame and processing the audio samples is based on a master clock.

10. The method of claim 1, wherein scheduling of retrieving the received data packet from the packet buffer and decoding the at least one coded audio frame is performed by adjusting at least one of:
    clocking of retrieving the received data packet from the packet buffer and decoding the at least one coded audio frame, and
    clocking of processing the audio samples.

11. The method of claim 1, wherein processing the audio samples comprises:

initializing a playout time of the audio samples based on at least one of the following:
a position indicating a start of the audio frame,
a number of retransmissions of the audio frame,
a retransmission of the data packet comprising the audio frame,
an internal processing time.

12. A device for controlling end-to-end latency between receiving and processing audio frames, the device comprising:
a packet buffer configured to receive a data packet comprising at least one coded audio frame;
a decoder configured to retrieve the received data packet from the packet buffer and to decode the at least one coded audio frame into audio samples;
an audio processor configured to process the audio samples; and
a scheduler configured to schedule retrieving the received data packet from the packet buffer and decoding of the at least one coded audio frame when an audio quality of the audio samples is above a first threshold and a latency between received data packet and processing the audio samples is below a second threshold,
wherein the scheduler is configured to shift the scheduling in time in order to avoid audio distortions.

13. The device of claim 12, further comprising:
an audio buffer coupled between the decoder and the audio processor, wherein the decoder is configured to store the audio samples in the audio buffer and the audio processor is configured to retrieve the audio samples from the audio buffer.

14. The device of claim 13, wherein the scheduler is configured to adjust at least one of:
an access rate of the decoder for storing the audio samples in the audio buffer,
an access rate of the audio processor for retrieving the audio samples from the audio buffer,
an access rate of pull requests to the audio buffer.

15. The device of claim 14, wherein the scheduler is configured to adjust the access rate of the decoder based on a first clock and the access rate of the audio processor based on a second clock, wherein the first clock and the second clock are derived from a master clock.

16. The device of claim 12, wherein the scheduler is configured to schedule retrieving the received data packet from the packet buffer and decoding of the at least one coded audio frame based on adjusting a time-scaling of the decoder for decoding the at least one coded audio frame.

17. The device of claim 12, wherein the decoder comprises at least one of a speech decoder and a speech time scaler.

18. A method for adjusting a size of a jitter buffer in a media processing circuit of a mobile terminal, the method comprising:
depacketizing at least one coded media frame from a received radio signal;
storing the depacketized at least one coded media frame in a jitter buffer;
retrieving the at least one coded media frame from the jitter buffer and decoding the at least one coded media frame into media samples;
identifying a mobility scenario corresponding to a degree of mobile terminal mobility based on information indicating a mobility state of the mobile terminal;
determining a jitter model based on the mobility scenario using the information indicating the mobility state of the mobile terminal;
adjusting the jitter model based on a history of the information indicating the mobility state of the mobile terminal; and
adjusting a size of the jitter buffer based on the adjusted jitter model.

19. The method of claim 18, wherein the information indicating the mobility state of the mobile terminal comprises at least one of the following information related to the mobile terminal:
speed or velocity information,
location information,
environment information,
time information,
change of velocity or acceleration information.

20. The method of claim 18, further comprising:
adjusting the size of the jitter buffer based on a network jitter that is estimated based on the jitter model in accordance with the information indicating the mobility state of the mobile terminal.

21. The method of claim 20, further comprising:
estimating the network jitter as a cyclic function derived from the information indicating the mobility state of the mobile terminal.

22. A media processing circuit for use in a mobile terminal, the media processing circuit comprising:
a depacketizer configured to depacketize at least one coded media frame from a received radio signal;
a jitter buffer configured to store the depacketized at least one coded media frame;
a decoder configured to retrieve the at least one coded media frame from the jitter buffer and to decode the at least one coded media frame into media samples; and
a jitter buffer management entity configured to determine a jitter model based on an identified mobility scenario corresponding to a degree of mobile terminal mobility in accordance with information indicating a mobility state of the mobile terminal, to adjust the jitter model based on a history of the information indicating the mobility state of the mobile terminal, and to adjust a size of the jitter buffer based on the adjusted jitter model.

23. The media processing circuit of claim 22, wherein the jitter buffer management entity comprises an interface to a location service providing entity to receive the information indicating the mobility state of the mobile terminal.

24. The media processing circuit of claim 22, wherein the jitter buffer management entity is configured to adjust the size of the jitter buffer based on at least one of the following information related to the mobile terminal:
speed or velocity information,
location information,
environment information,
time information,
change of velocity or acceleration information.

25. The method of claim 21, wherein the cyclic function is characterized by a jitter amplitude and a jitter period, the jitter amplitude being defined as a difference between packets with highest transfer times and packets with lowest transfer times, and the jitter period being defined as a time elapsed between two peaks of jitter.

* * * * *